United States Patent [19]
Norrie et al.

[11] Patent Number: 5,426,783
[45] Date of Patent: Jun. 20, 1995

[54] SYSTEM FOR PROCESSING EIGHT BYTES OR LESS BY THE MOVE, PACK AND UNPACK INSTRUCTION OF THE ESA/390 INSTRUCTION SET

[75] Inventors: Chris Norrie, San Jose; Stephen J. Rawlinson; Allan Zmyslowski, both of Sunnyvale, all of Calif.

[73] Assignee: Amdahl Corporation, Sunnyvale, Calif.

[21] Appl. No.: 970,418

[22] Filed: Nov. 2, 1992

[51] Int. Cl.[6] .......................... G06F 9/24; G06F 9/30; G06F 9/38
[52] U.S. Cl. .................... 395/800; 364/229.5; 364/232.23; 364/240.5; 364/254.7; 364/255.7; 364/255.8; 364/262.4; 364/262.81; 364/262.9; 364/DIG. 1; 364/DIG. 2; 395/375
[58] Field of Search .............. 395/375, 800, 400, 575, 395/425, 600, 650, 500, 550, 325, 775, 725; 364/DIG. 1, DIG. 2

[56] References Cited

U.S. PATENT DOCUMENTS

| | | | |
|---|---|---|---|
| 4,376,976 | 3/1983 | Lahti et al. | 395/375 |
| 4,750,112 | 6/1988 | Jones et al. | 395/375 |
| 4,926,323 | 5/1990 | Baror et al. | 395/375 |
| 5,269,017 | 12/1993 | Hayden et al. | 395/575 |

*Primary Examiner*—Alyssa H. Bowler
*Assistant Examiner*—Daniel H. Pan
*Attorney, Agent, or Firm*—Fliesler, Dubb, Meyer & Lovejoy

[57] ABSTRACT

A processing system comprising a first means for generating first signals indicating when the next instruction can begin processing where eight or less bytes are processed by the MOVE, PACK or UNPACK instruction, a second means for generating second signals if an overlap condition exists for the MOVE, PACK or UNPACK instruction being processed, and where the first means generates the first signals prior to the second means generating the second signals and independent of whether the second means generates the second signals.

10 Claims, 5 Drawing Sheets

MOVE

| FLOW 1 | D | A | T | B | X | W |   |
| FLOW 2 |   | D | A | T | B | X | W |
| FLOW 3 |   |   | D | A | T | B | X | W |

PACK / UNPACK

| FLOW 1 | D | A | T | B | X | W |   |   |
| FLOW 2 |   | D | A | T | B | X | W |   |
| FLOW 3 |   |   | D | A | T | B | X | W |
| FLOW 4 |   |   |   | D | A | T | B | X | W |

|  |  | BYTES | | | | | | | |
|---|---|---|---|---|---|---|---|---|---|
|  |  | A | B | C | D | E | F | G | H |
| FIELD LENGTH | ADDR DIFF | | | | | | | | |
| 2 | 1 | A | A | | | | | | |
| 3 | 1 | A | A | A | | | | | |
|  | 2 | A | B | A | | | | | |
| 4 | 1 | A | A | A | A | | | | |
|  | 2 | A | B | A | B | | | | |
|  | 3 | A | B | C | A | | | | |
| 5 | 1 | A | A | A | A | A | | | |
|  | 2 | A | B | A | B | A | | | |
|  | 3 | A | B | C | A | B | | | |
|  | 4 | A | B | C | D | A | | | |
| 6 | 1 | A | A | A | A | A | A | | |
|  | 2 | A | B | A | B | A | B | | |
|  | 3 | A | B | C | A | B | C | | |
|  | 4 | A | B | C | D | A | B | | |
|  | 5 | A | B | C | D | E | A | | |
| 7 | 1 | A | A | A | A | A | A | A | |
|  | 2 | A | B | A | B | A | B | A | |
|  | 3 | A | B | C | A | B | C | A | |
|  | 4 | A | B | C | D | A | B | C | |
|  | 5 | A | B | C | D | E | A | B | |
|  | 6 | A | B | C | D | E | F | A | |
| 8 | 1 | A | A | A | A | A | A | A | A |
|  | 2 | A | B | A | B | A | B | A | B |
|  | 3 | A | B | C | A | B | C | A | B |
|  | 4 | A | B | C | D | A | B | C | D |
|  | 5 | A | B | C | D | E | A | B | C |
|  | 6 | A | B | C | D | E | F | A | B |
|  | 7 | A | B | C | D | E | F | G | A |

FIG. 6

SYSTEM FOR PROCESSING EIGHT BYTES OR LESS BY THE MOVE, PACK AND UNPACK INSTRUCTION OF THE ESA/390 INSTRUCTION SET

BACKGROUND OF THE INVENTION

The present invention relates to the processing of computer instructions in a computer system.

DESCRIPTION OF THE RELATED ART

The IBM *ESA/390 Principles of Operation* defines the MOVE, PACK and UNPACK instructions.

In the MOVE instruction a second operand is placed at the first operand's location and each operand is processed left to right. When the operands overlap, the result is obtained as if the operands were processed one byte at a time and each result byte were stored immediately after fetching the necessary operand byte.

As part of the execution of the MOVE instruction a check is made for destructive overlap of the operand. Operands are said to overlap destructively when the first operand location is used as a source after data has been moved into it, assuming the inspection for overlap is performed by the use of logical operand addresses.

In the PACK instruction the format of the second operand is changed from zoned to packed and the result is placed at the first-operand location. The result is obtained as if the operands where processed right to left. When necessary, the second operand is considered to be extended on the left with zeros. If the first operand is too short to contain all digits of the second operand, the remaining left-most portion of the second operand is ignored. Access exceptions for the unused portion of this second operand may or may not be indicated. When the operands overlap the result is obtained as if each result byte was stored immediately after fetching the necessary operand bytes. Two stored operand bytes are needed for each result byte, except for the right-most byte of the result field which requires only the right-most second operand byte.

In the UNPACK instruction the format of the second operand is changed from packed to zoned and the result is placed at the first operand address. The result is obtained as if the operands were processed right to left. When necessary, the second operand is considered to be extended on the left with zeros. If the first operand field is too short to contain all digits of the second operand, the remaining left-most portion of the second operand is ignored. Access exceptions for the unused portion of the second operand may or may not be indicated. When the operands overlap the result is obtained as if the operands were processed one byte at a time and as if the resulting bytes were stored immediately after fetching the first operand byte. The entire right-most second operand byte is used in forming the first result byte. For the remainder of the field information for the two result bytes is obtained from a single second operand byte and execution proceeds as if the left-most four bits of the byte were to remain available for the next result byte and need not be refetched. Thus, the result is as if the two result bytes were to be stored immediately after fetching a single operand byte. A field that is to be unpacked can be destroyed by improper overlapping. To save storage space for unpacking by overlapping the operands, the right-most byte of the first operand must be to the right of the right-most byte of the second operand by the number of bytes in the second operand minus two. If only one or two bytes are to be unpacked, the right-most byte of the two operands may coincide.

In each of these instructions bytes are fetched from operand 2 and stored in operand 1. When no overlap exists these instructions parallel process eight bytes of data at a time. When overlap does occur, in order to assure proper results, the instructions process the data effectively one byte at a time which is referred to as a one byte mode of operation. Many computer systems, invoking the use of the instruction set as set forth in International Business Machine Corporation's *ESA/390 Principles of Operation*, employ the concept of pipeline processing of instructions. In order to carry out a computer instruction a series of operations are performed by the computing system for each of the instructions within the instruction set. In a computer system using the pipeline concept of instruction processing, the instructions are broken down into a series of FLOWs where each FLOW contains a series of cycles. Referring to FIG. 2, the FLOWs for instructions are illustrated. Each FLOW is broken down into six cycles, a decode operation code cycle D, an address presentation cycle A, a translation cycle T, a buffer access cycle B, an execution cycle X and, finally, a write or store cycle W. In order to process the instructions faster the FLOWs overlap such that different steps in the instructions are being processed at the same time rather than sequentially where each step is completed before starting the next step. In the MOVE, PACK and UNPACK instructions an overlap condition can exist between the location from which data can is being fetched from and the location in which the data, once processed, is stored. In many computer systems employing the pipeline system, eight bytes of data are parallel processed at the same time. When an overlap occurs, the requirements are that the instructions be carried out one byte at a time to generate the desired results. While overlap of operands within the MOVE, PACK and UNPACK instructions are the exception rather than the rule, the possibility of an overlap condition requires that overlap be tested for during each MOVE, PACK or UNPACK instruction such that the system can go from the mode of processing eight bytes at a time to the mode of processing one byte at a time.

Testing for an overlap condition in the MOVE, PACK and UNPACK instructions cannot be done until the instruction has obtained both the address from which data is to be fetched from and the address in which processed data is to be stored into. In a pipeline system the address of the location from which data is going to be fetched is available during cycle A of FLOW 1, the address in which data is going to be stored is available in cycle A of FLOW 2 and the determination of an overlap is performed during cycle T of FLOW 2. Cycle D in a FLOW is used to inform the system that the present FLOW is the last FLOW for this instruction and that the next instruction may be initiated in the next FLOW. The first cycle D to occur at the same time or after the occurrence of the cycle T in FLOW 2 is in FLOW 4. Thus, for those instructions requiring a testing for overlap, those instructions will use a minimum of four FLOWs to be completed regardless of whether the instruction could have been completed in less FLOWs if no overlap is encountered.

In processing the MOVE, PACK and UNPACK instructions the computing system processes the instructions with the assumption that an overlap condition does exist until it is determined otherwise in the T cycle of the FLOW 2. In the situations where eight bytes or less of data is to be processed by either the MOVE, PACK or UNPACK instruction and an overlap condition did not exist and, if it was not to require to test the instruction for an overlap condition, the MOVE instruction could be completed in two FLOWs and the PACK and UNPACK instructions could be completed within three FLOWs.

SUMMARY OF THE INVENTION

It is an object of the invention to execute the MOVE, PACK and UNPACK instructions without incurring the delay associated with determining whether an overlap condition exists.

It is another object of the invention to allow the MOVE instruction to be completed in two FLOWs if eight or less bytes of data is to be moved regardless of whether there is an overlap condition.

It is another object of the invention to allow the PACK instructions to be completed in three FLOWs where the number of bytes to be packed is eight bytes or less and there is no overlap.

It is another object of the invention to execute the UNPACK instruction in three FLOWs if both the number of bytes to be unpacked and the field length of the field to receive the unpacked data are both eight bytes or fewer and no overlap.

Briefly, the invention comprises means for determining if eight bytes or less are to be processed by the MOVE, PACK and UNPACK instructions and if so determined to signal that the instruction is in its last FLOW before the determination for the overlap condition is completed. Where thereafter an overlap condition for the MOVE instruction is detected, specific hardware is invoked for generating the proper resulting bytes as if the MOVE instruction had moved one byte of data at a time. The resulting bytes are made available for storage during the storage cycle of the last FLOW. In the PACK and UNPACK instructions, if an overlap condition is thereinafter detected, means are provided for trapping the PACK and UNPACK instruction thereby halting the processing of the instruction in the pipeline and branching to macrocode for the completion of the processing of the instruction. After the macrocode has completed processing the PACK or UNPACK instruction, the pipeline will be re-initiated for the next instruction following the instruction giving rise to the branch to macrocode.

The advantage of the present invention is to allow the PACK, UNPACK and MOVE instructions to be executed within the minimum number of FLOWs where an overlap condition is not detected thereby increasing the overall performance of the system when executing the MOVE, PACK or UNPACK instructions.

BRIEF DESCRIPTION OF THE DRAWINGS

The invention will be described with respect to the particular embodiments thereof and reference will be made to the drawings, in which:

FIG. 6 is a table showing what the resulting bytes should be as a function of the number of bytes to be moved and the difference between the addresses from which the data is to be obtained and to which the data is to be stored.

DETAILED DESCRIPTION OF THE PREFERRED EMBODIMENTS

The invention provides a system which avoids the necessary delay in determining if an overlap condition exists in a MOVE, PACK and UNPACK instruction when in fact no overlap condition exists. Each instruction is processed by a series of FLOWs where each FLOW contains a plurality of cycles. The FLOWs overlap each other such that multiprocessing can be taking place thereby allowing the instruction to be completed in the shortest period of time. A problem arises in such a pipeline when a given FLOW within the sequence of FLOWs requires information that is generated by a previous FLOW where the previous FLOW does not yet have the information available for the present FLOW.

Figures 2, 3:
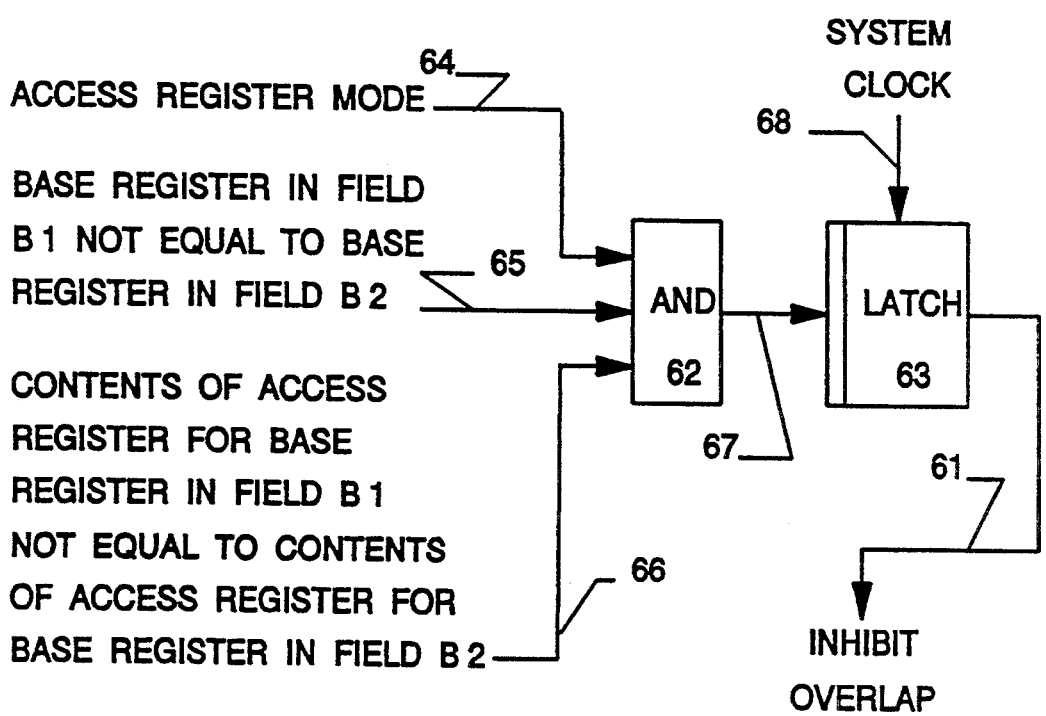
FIG. 2 depicts the FLOWs and cycles within each FLOW for the MOVE, PACK and UNPACK instructions.
FIG. 3 is a logic diagram for generating an inhibit overlap signal.

Referring to FIG. 2, a series of FLOWs for the MOVE and PACK/UNPACK instructions are shown. Each FLOW as previously discussed comprises six cycles. In the MOVE instruction it is not until the T cycle of FLOW 2 that a determination can be made that an overlap condition exists. A determination can be made in the FLOW 1 of the MOVE instruction if the MOVE instruction is to move eight bytes or less. If eight bytes or less are to be moved by the MOVE instruction and no overlap condition exists, the MOVE instruction could not be completed by the end of FLOW 2. When an instruction is to be completed at the end of the FLOW 2 it is necessary to inform the system prior to the start of FLOW 3 that the system is to initiate the processing of the next instruction in FLOW 3. This invention generates a signal that the MOVE instruction can be completed at the end of FLOW 2 whenever the number of bytes to be moved is eight bytes or less, regardless of a possible overlap. When an overlap condition is sensed in the T cycle of the second FLOW, logic is provided to generate the proper resulting bytes for the instruction such that the instruction may be completed at the end of FLOW 2. Therefore, this invention allows the MOVE instruction to be completed in two FLOWs regardless of an overlap condition where the number of bytes to be moved are eight bytes or less. This results in a substantial saving of time in processing the MOVE instruction and enhances the performance of the overall computer system.

The PACK instruction would be completed in three FLOWs if the number of bytes to be processed for the PACK instruction is eight bytes or less. The UNPACK instruction would be completed in three FLOWs if the number of bytes to be processed is eight bytes or less and the field length for storing the resulting bytes is eight bytes or less. Again, the PACK and UNPACK instructions, if it is going to be completed in three FLOWs, must initiate a signal to the processor that such is the case. It is in the D cycle of a FLOW that the decision is made whether or not a new instruction can be started in the D cycle of the next FLOW. The invention generates in D cycle of FLOW 3 of the PACK and UNPACK instructions the signal that a new instruction should begin in FLOW 4 whenever the condition exists that the PACK and UNPACK instructions could have been completed within the third FLOW as described above. When in the T cycle of FLOW 2 a determination is made that an overlap condition exists and the PACK or UNPACK instruction would have been completed in three FLOWs if no overlap is detected, then the system branches to a macrocode program which emulates the instruction being processed and completes the instruction being processed. The pipeline is interrupted when such a branch occurs such that any FLOWs that are in process are completed but the effects of the processing of those FLOWs are nullified. When the macrocode has completed the instruction the macrocode returns back to the next instruction to be processed. The emulation of the PACK or UNPACK instruction by macrocode is well understood by those skilled in the art and does not constitute part of this invention. Since the occurrence of an overlap situation in the PACK and UNPACK instruction is rare, the time saved by reducing the number of FLOWs necessary to complete the instruction results in enhancing the overall performance of the system.

Figure 1:
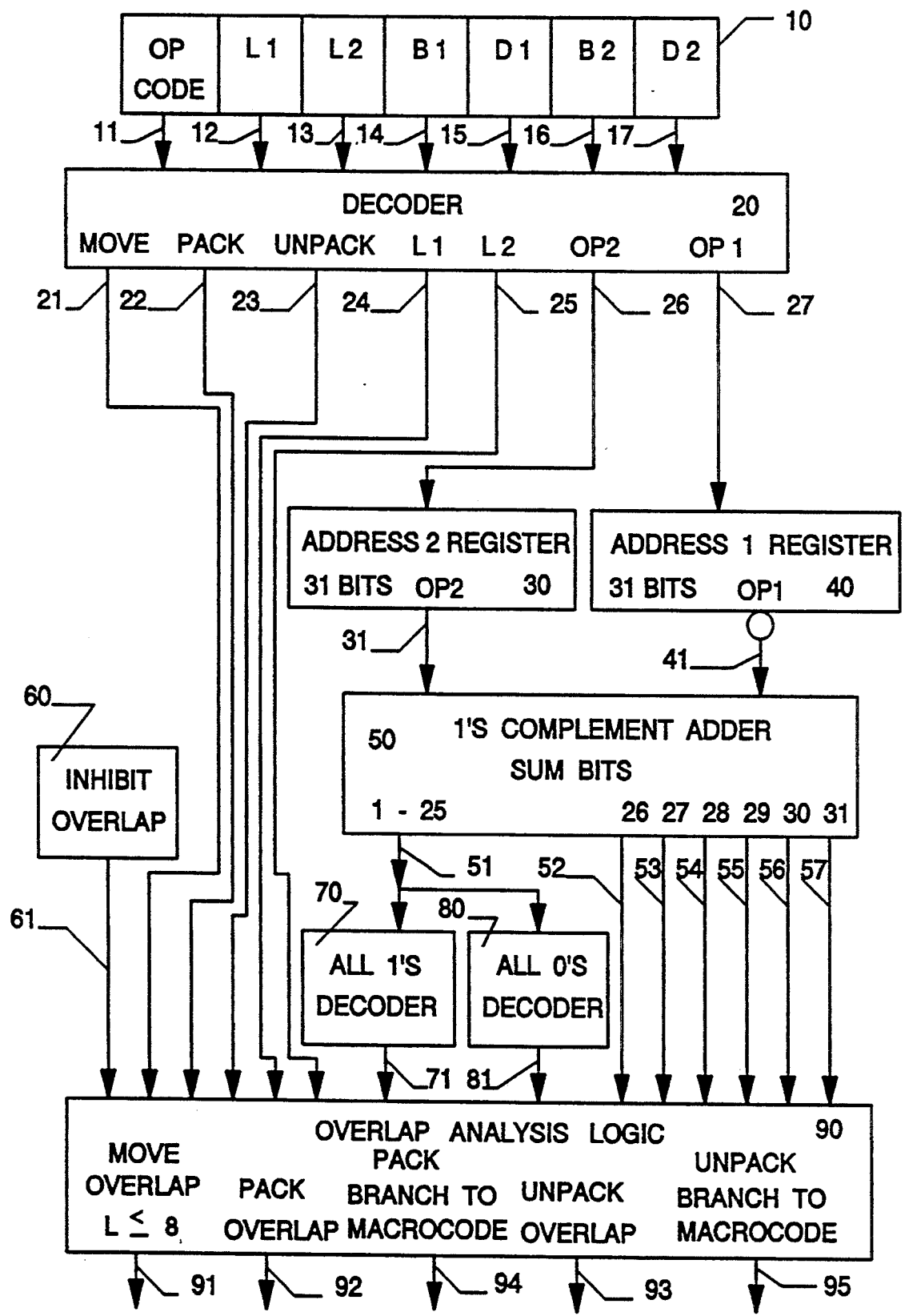
FIG. 1 is a logic diagram of the overlap analysis system of the invention.

Referring to FIG. 1, the instruction is received and stored in register 10. The operation code is in field OP code. Fields B1 and D1 are used to generate the address for the first operand OP1 and fields B2 and D2 are used to generate the address for the second operand OP2. In the MOVE instruction, fields L1 and L2 are combined to form one field L which defines the number of bytes to be moved during the MOVE instruction. In the PACK and UNPACK instructions, field L1 defines the length of the field in bytes in which data is to be stored and field L2 defines the number of bytes to be packed or unpacked. The number stored within fields L, L1 and L2 is one less than the number of actual bytes associated with that field.

Decoder 20 is connected to register 10 and receives from register 10 the contents of register 10. Decoder 20 will decode the OP code field and generate a MOVE signal on line 21 if the instruction decoded is a MOVE instruction, a PACK signal on line 22 if the instruction decoded is a PACK instruction, and an UNPACK signal on line 23 if the instruction decoded is an UNPACK instruction. Fields L1 and L2 are not processed by the decoder and are shown herein as being outputted on lines 24 and 25. Decoder 20 generates an address OP2 from fields B2 and D2 of register 10 and stores address OP2 in address register 30. Decoder 20 generates an address OP1 from fields B1 and D1 of register 10 and provides address OP1 by line 27 to be stored in address register 40. Addresses OP1 and OP2 are both 31 bits in length. The complement of address OP1 is provided to complement adder 50 by lines 41 and the address OP2 is provided on lines 31 to complement adder 50. Complement adder 50 adds the numbers generated on lines 41 and 31 and produces a series of sum bits 1 through 31 with the carry out bit being discarded. In effect, the one's complement adder 50 performs a subtraction between address OP2 and OP1 indicating the offset between address OP2 and OP1. Decoder 70 deciphers sum bits 1 through 25 and determines if all sum bits 1 through 25 are ones. Sum bits 1 through 25 will be all ones whenever address OP1 is greater than or equal to address OP2 by up to 63 bytes. The output of decoder 70 is provided on line 71 to overlap analysis logic 90. Decoder 80 deciphers sum bits 1 through 25 and determines if all sum bits 1 through 25 are zeros. Sum bits 1 through 25 will all be zeros whenever address OP2 is greater than address OP1 by up to 64 bytes. The output of decoder 80 is provided on line 81 to overlap analysis logic 90. Sum bits 26 through 31 are provided on lines 52 to 57 to overlap analysis logic 90.

Inhibit overlap logic 60 determines if address OP2 and OP1 are in the same address space and will inhibit the overlap analysis when the addresses OP2 and OP1 are in different address spaces since no overlap could occur. The output of the inhibit overlap logic is provided on line 61 to overlap analysis logic 90.

Overlap analysis logic 90 interrogates its various inputs and generates (1) a MOVE overlap signal on line 91 whenever the MOVE instruction would move eight bytes or less and an overlap condition is detected, (2) a PACK overlap signal on line 92 whenever a PACK overlap is detected, (3) a PACK BRANCH TO MACROCODE signal on line 94 whenever a PACK overlap is detected and eight bytes or less are to be packed, (4) an UNPACK overlap signal on line 93 whenever an overlap is detected in an UNPACK instruction and (5) an UNPACK BRANCH TO MACROCODE signal on line 95 whenever eight bytes or less are to be unpacked and the length of the field to receive the UNPACK data is eight bytes or less.

Referring to FIG. 3, the inhibit overlap logic is shown in detail. AND 62 will be conditioned when the system is in the access register mode which will be true during a MOVE, PACK and UNPACK instruction as indicated on line 64, when the base registers in fields B1 and B2 of register 10 are not equal as indicated on line 65 and when the contents of the access register associated with the base register in field B1 is not equal to the contents of the access register associated with the base register field B2 as provided on line 66. When these three conditions are met the addresses OP2 and OP1 will be located in different address spaces. The state of AND 62, provided on line 67, is read into latch 63 by the system clock on line 68. Latch 63 provides an inhibit overlap signal on line 61 to the system.

In the MOVE, PACK and UNPACK instructions the data to be moved, packed or unpacked is located by address OP2 and the MOVE, UNPACK or PACK data is stored into the address indicated by OP1. Therefore, these instructions fetch the data from address OP2 and store the resulting data in address OP1.

In general an overlap will occur in the MOVE instruction, if address OP1 is equal to or greater than address OP2 and address OP1 is equal to or less than address OP2 plus the length of the field to be moved as defined by the length field L.

Specifically, the MOVE instruction does not encounter the destruction of any data during the MOVE instruction when address OP2 is equal to address OP1. Therefore, even though this is an overlap condition, no overlap action need be taken. An overlap condition for eight bytes or less will occur when all of the five following conditions are met:

1) $OP1 \geq OP2$;
2) $OP1 \neq OP2$;
3) $L \leq 7$;

4) OP1−OP2≦L;

5) Inhibit Overlap not set.

Figure 4:
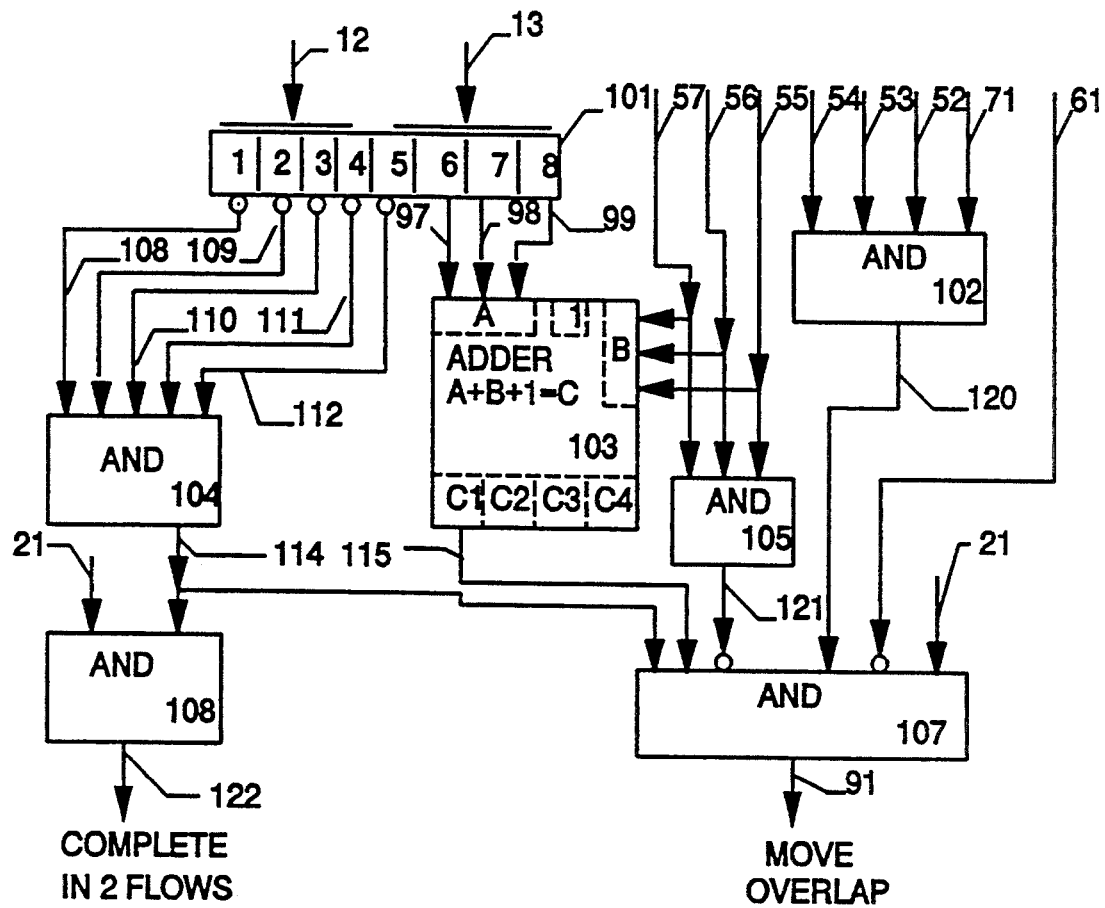
FIG. 4 is the logic for determining that less than eight bytes are to be processed and an overlap condition exists in the MOVE instruction.

Referring to FIG. 4, the logic for testing for the five previous conditions is shown. Register 101 receives the contents of the length fields L1 and L2 via lines 12 and 13. As previously stated, these two length fields are combined into a single length field in this instruction. The first condition is tested for by the means of AND 102 which will be conditioned when address OP1 is eight bytes or less greater than address OP2. The second condition is tested by the combination of AND 102 and AND 105 which will only condition AND 107 when address OP1 and address OP2 are not equal. Condition 3 is tested by means of AND 104 which will be conditioned whenever the number of bytes to be moved is eight or less. It should be noted here that the content of register 101 is one less than the number of bytes to be moved. Adder 103 tests for the fourth condition. Adder 103 adds (A) a 3-bit number received from register 101, (B) a 3-bit field comprised by lines 55, 56 and 57 from complement adder 50 and (C) a binary one. Where the sum of these three numbers cause the summation to be greater than seven thereby causing stage C1 of the summation to be a 1, then the difference between address OP1 and OP2 will be less than the number of bytes to be moved as indicated by register 101. The output of stage C1 of adder 103 is connected to AND 107 by line 115. Condition 5 is determined by line 61 which indicates whether or not the inhibit overlap latch has been set. AND 107 tests for the coincidences of conditions 1 through 5 and generates a MOVE overlap signal on line 91 when all the foregoing conditions are met.

AND 108 will be conditioned whenever there is a MOVE instruction as indicated on line 21 and less than eight bytes are to be moved as indicated by AND 104 on line 114. The output of AND 104 is available during the first FLOW of the MOVE instruction such that the D cycle of FLOW 2 of the MOVE instruction may signal the system to begin the next instruction in the D cycle of the next FLOW. The MOVE instruction will use only one execution cycle in FLOW 2 and the MOVE instruction will be completed at the end of FLOW 2. It should be noted that AND 108 is conditioned regardless of whether or not overlap occurs.

Figure 5:
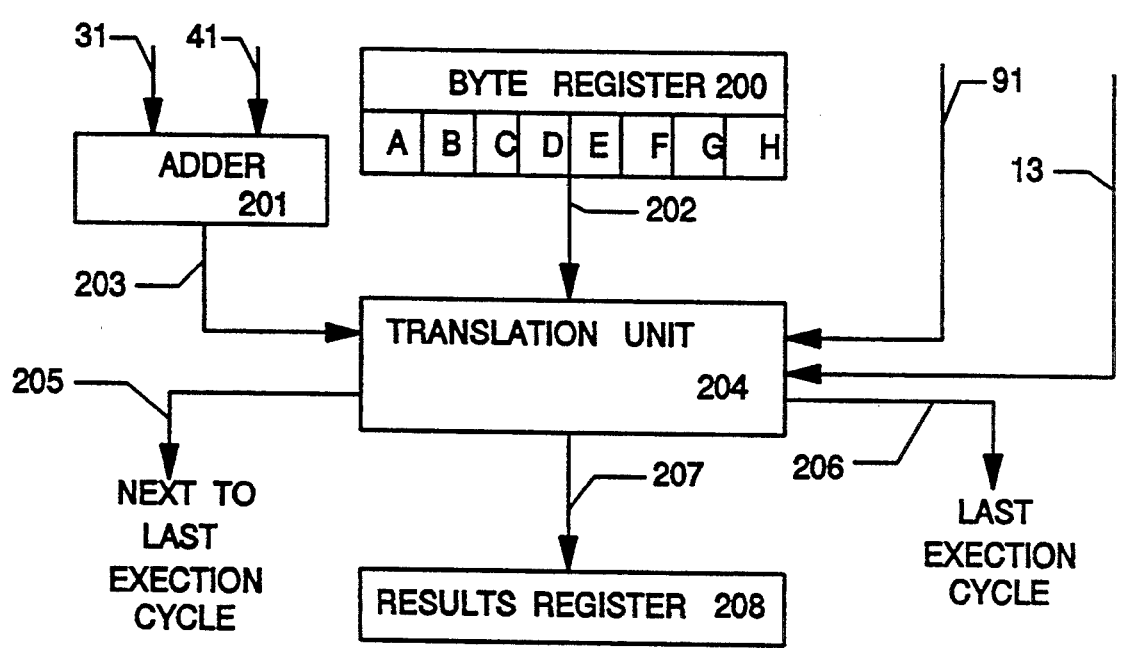
FIG. 5 is the logic that generates the proper resulting bytes where eight bytes or less are to be moved and an overlap condition exists in the MOVE instruction.

Referring to FIG. 5, when a MOVE overlap signal is generated on line 91 the system must generate the correct byte configuration for the MOVE instruction as if one byte was moved at a time. The logic as shown in FIG. 5 performs such a function. Byte register 200 receives the eight or less bytes to be moved during the MOVE instruction. These bytes are labeled A through H for purposes of this example. Adder 201 receives the three low order bits for address OP1 from address register 40 on lines 41 and the three low order bits for address OP2 from address register 30 on lines 31. In that the address from address register 40 is inverted, adder 201 provides the difference between the two addresses on line 203 to the translation unit 204. In addition, translation unit 204 receives the MOVE overlap signal on line 91, the contents of byte register 200 and the three low order bits from field L2 from register 10. The three low order bits are the only bits that are necessary since it has already been determined by the MOVE overlap signal that eight or less bytes are to be moved. Translation unit 204 may use a plurality of execution cycles during the second FLOW to accomplish the translation. When the translation unit needs more than one execution cycle X in FLOW 2, the pipeline is paused until the translation unit 204 has completed its task. The system is designed to receive information as to when the translation unit 204 will complete its task such that the system may again re-initiate processing in the pipeline. For this reason, a next to last execution cycle signal is provided on line 205 and a last execution signal is provided on line 206 to the system to allow the re-initiation of the pipeline at the proper time. The results of the translation unit 204 are stored in result register 208 which is used during the store cycle W of FLOW 2 for storing the results of the MOVE instruction when a MOVE overlap signal has been generated on line 91.

FIG. 6 is a table which shows all the conditions that the translation unit 204 might encounter during an overlap. Across the top of the table is indicated the bytes that are stored in byte register 200. It again should be noted that the MOVE overlap signal 91 is only generated when data would be destroyed during an overlap instruction where eight or less bytes are being moved. The contents of result register 208 is shown as a function of the number of bytes to be moved and address difference between OP1 and OP2. In the preferred embodiment of the invention the translation unit will generate the byte configurations shown for field length of 8 and address differences 1 through 7 as a function of the address difference regardless of the field length. Therefore, the input to translation unit 204 for the field length on line 13 is not necessary. This is done because the byte configuration for resulting register 208 can be generated for all eight bytes in the same time as it can be generated for any other situation of less than eight bytes. The storage cycle W of the FLOW 2 will only store the number of bytes indicated in the length field.

In the foregoing manner, the MOVE instruction is completed in two FLOWs whenever eight bytes or less are moved regardless of whether an overlap condition exists thereby increased system performance.

In the PACK and UNPACK instructions both operands OP1 and OP2 have associated byte field lengths L1 and L2. The maximum number of bytes that can be PACKED or UNPACKED in a given instruction is 16. In the UNPACK instruction an overlap condition will be detected when address OP1 is equal to or greater than address OP2 and address OP2 plus field L2 is greater than or equal to address OP1. An overlap can also occur where address OP2 is greater than address OP1 and address OP1 plus field L1 is equal to or greater than address OP2.

More specifically, an overlap in the UNPACK instruction of only one byte will not be destructive nor will the occasion of fields L1 and L2 both being equal to zero give rise to a destructive result. Therefore, these conditions can be disregarded and only the remaining conditions need be tested for.

The two sets of conditions tested can be expressed by conditions 1a through 5a and conditions 1b through 5b as set forth below.

| | |
|---|---|
| 1a | OP1 ≧ OP2 |
| 2a | L1 ≠ 0 |
| 3a | L2 ≠ 0 |
| 4a | OP1 − OP2 ≦ L2 |
| 5a | Inhibit overlap not set |
| | or |
| 1b | OP2 > OP1 |
| 2b | L1 ≠ 0 |
| 3b | L2 ≠ 0 |
| 4b | OP2 − OP1 ≦ L1 |

| | |
|---|---|
| 5b | Inhibit overlap not set |

Figure 7:
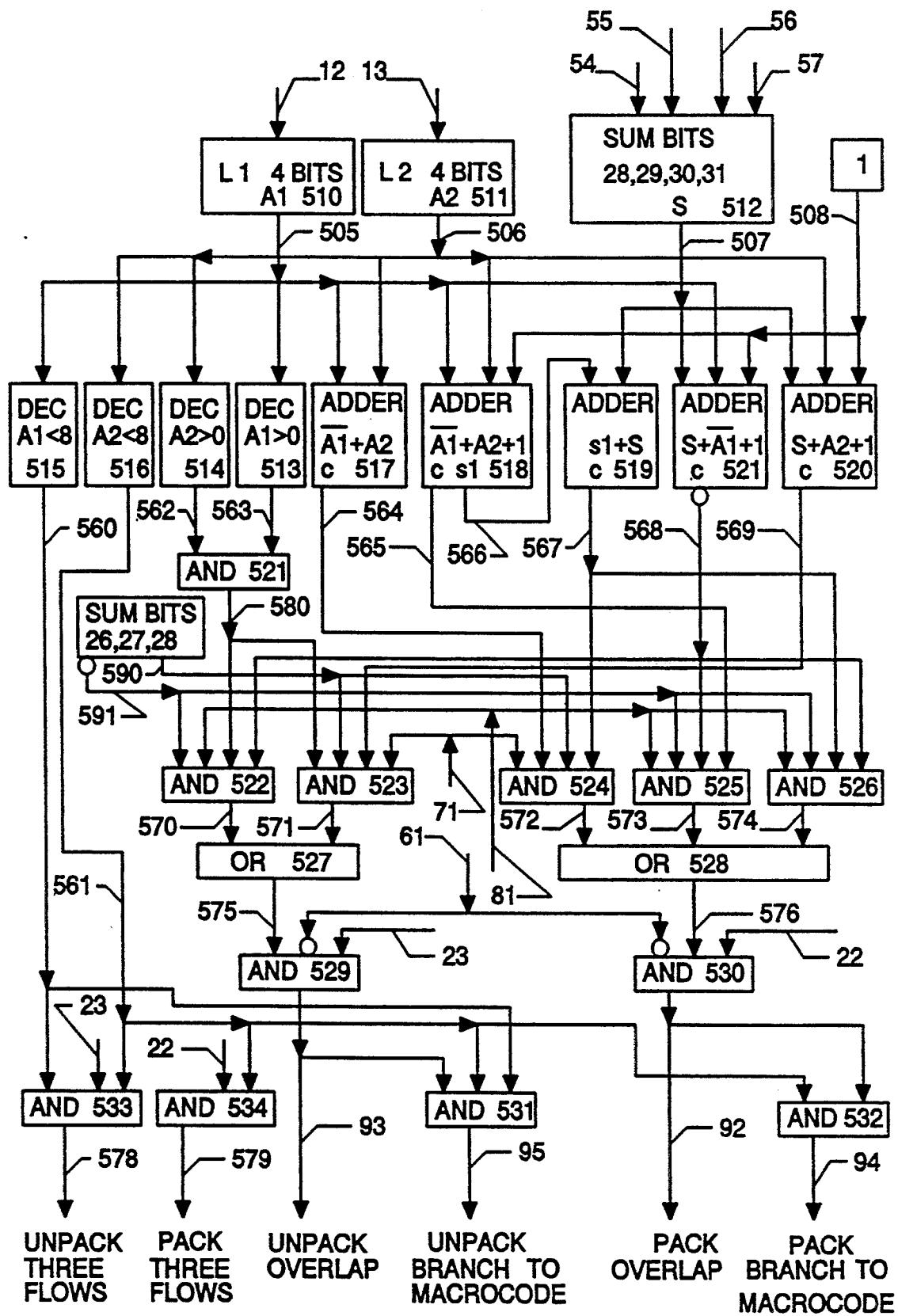
FIG. 7 is a logic diagram for the PACK and UNPACK instructions for determining overlap and if a branch to macrocode should be taken and for generating a signal that the instruction will be completed at the end of three FLOWs.

Referring to FIG. 7, field L1 is stored in register 510 and field L2 is stored in register 511. The contents of field L1 are referred to as A1 and the contents of field L2 are referred to as A2. Sum bits 28 through 31 are received via 1 ines 54 through 57 by register 512. Sum bits 28 through 31 are indicated by the symbol S and is provided to the rest of the logic via line 507. A binary one is provided on line 508 to be used by the logic. Decoder 515 produces an output when the contents A1 of register 510 are less than eight. Detector 516 interrogates the contents A2 of register 512 and produces an output when A2 is less than eight. An output from detector 516 on line 561 means that less than eight bytes of data is to be fetched by the instruction. The output of detector 515 on line 560 means that the length of the field to receive the data is less than eight bytes long. As previously stated, in an UNPACK instruction where there are less than eight bytes to be fetched and the field length of the location to which the data is to be stored is eight or less bytes then the instruction can be completed in three FLOWs. AND 533 receives the outputs of decoders 516 and 515 as well as for the UNPACK instruction signal on line 23. The coincidence of these three signals will condition AND 533 to produce an output signal 578 which will allow the UNPACK instruction during the D cycle of the third FLOW to inform the system to begin the operation of the next instruction at the beginning of the next FLOW. Again it should be noted that this condition is raised regardless of whether or not an overlap is detected by the remaining logic.

Condition 1a is tested by line 71 the output of decoder 70 and by line 590 which represents bits 26, 27 and 28 on lines 52, 53 and 53 from complement adder 50, the combination indicating that sum bits 1 through 28 are all ones. Condition 1b is tested by line 81 from decoder 80 and by line 591 which represents the inverted value of sum bits 26, 27 and 28 on lines 26, 27 and 28 from complement adder 50, the combination indicating that sum bits 1 through 28 are all zeros. Detector 514 provides a signal on line 562 whenever the contents A2 of register 511 are not equal to zero. Detector 513 will provide an output signal on line 563 whenever the contents A1 of register 510 is not equal to zero. AND circuit 521 is conditioned by the coincidence of signals appearing on lines 562 and 563 and provides an output on line 580. AND circuit 521 is conditioned when the criteria of 2a and 3a are met in the first set of conditions and conditions 2b and 3b are met in the second set of conditions. Adder 520 tests for the condition 4a. Adder 521 tests for the condition 4b. AND 523 will be conditioned upon the coincidence of all conditions 1a through 4a. AND 522 will be conditioned upon the coincidence of the conditions being met of 1b through 4b. The output of AND 522 and AND 523 are connected to OR 527 by lines 570 and 571 respectively. The output of OR 527 is connected to AND 529 by line 575. The INHIBIT OVERLAP signal is provided by line 61 to the negative input of AND 529 which will provide an UNPACK OVERLAP signal on line 93 whenever the inhibit overlap latch is not set, an UNPACK instruction is being processed and an overlap condition is detected by line 575. AND 531 will be conditioned when an UNPACK overlap condition has been sensed by AND 529, the number of bits to be unpacked is less than eight as indicated by the output of decoder 516 on line 561, and the length of the field to which the unpacked data is to be stored is less than eight bytes as detected by detector 515. AND 531 will generate an UNPACK BRANCH TO MACROCODE signal on line 95. This signal will effectively cause the pipeline to recognize the UNPACK instruction will be performed by macrocode. The system will cause all unfinished FLOWs to be voided. Upon the macrocode completing the instruction, the macrocode will return back to the next instruction in the pipeline.

In general, the PACK instruction overlap conditions are the same as the UNPACK general overlap conditions and the conditions that gave rise to an overlap in UNPACK would give rise to an overlap in PACK. However, in the PACK instructions an overlap can exist without being destructive to data within the process of the instruction. These cases are again readily defined such that the overlap non-destructive situations may be ignored, allowing the instructions to be processed as if an overlap did not occur.

There are three sets of conditions which can give rise to destructive overlap in a PACK instruction. The first set of conditions is (1) address OP2 is less than or equal to the address OP1, (2) the length of the field L2 is greater than the length of field L1 and (3) the right-most byte of the field to be stored into must lie to the left of the right-most byte of the field to be packed. The second set of conditions are (1) address OP2 is greater than address OP1, (2) the length of field L2 is greater than the length field L1 and (3) the right-most byte is located at the same or to the right of address OP2. The third set of conditions are (1) address OP2 is greater than address OP1 and (2) the right-most byte of the field in which data is to be stored is located between the address OP1 and to the left of the right-most byte of the data in the field to be unpacked.

Logic statements for these three sets of conditions are stated below.

| | |
|---|---|
| 1a | $OP1 \geq OP2$ |
| 2a | $L2 > L1$ |
| 3a | $OP1 + L1 + 1 \leq OP2 + L2$ |
| | or |
| 1b | $OP2 > OP1$ |
| 2b | $L2 \geq L1$ |
| 3b | $OP1 + L1 \geq OP2$ |
| | or |
| 1c | $OP2 > OP1$ |
| 2c | $OP1 + L1 + 1 \leq OP2 + L2$ |
| 3c | $OP1 + L1 \geq OP2$ |

Referring to FIG. 7, the output of decoder 516 indicating that eight or less bytes are to be fetched in the instruction signal on line 561 is connected to AND 534. AND 534 is also conditioned by the PACK signal on line 22. When AND 534 is conditioned a signal is generated on line 579 indicating that the PACK instruction will be completed in FLOW 3 and allows the system to begin processing the next instruction in FLOW 4. Again, condition 1a is tested by line 71 from decoder 70 and conditions 1b and 1c are tested by line 81 from decoder 80. Condition 2a is tested by adder 517 and condition 2b is tested by adder 518. Adder 519 tests for conditions 3a and 2c. Adder 521 tests for conditions 3b and 3c. AND 524 tests for conditions 1a, 2a and 3a and provides an output when those conditions are met on line 572. AND 525 tests for conditions 1b, 2b and 3b and provides an output on line 573 when all these conditions are met. AND 526 is conditioned by the coincidence of conditions 1c, 2c and 3c and provides an output on line 574. OR 528 provides an output whenever either AND 524, 525 or 526 is conditioned. AND 530 will be conditioned when a condition output is sensed on line 576 from OR 528, a PACK instruction is being processed and the inhibit overlap latch is not set. The output of AND 530 is a PACK OVERLAP signal 92 indicating that a PACK overlap condition exists. AND 532 detects the condition that less than eight bytes or less are to be processed by the PACK instruction from the output of detector 516 on line 561 and the PACK OVERLAP signal on line 92 to generate a PACK BRANCH TO MACROCODE signal on line 94. As in the UNPACK instruction, the PACK BRANCH TO MACROCODE will cause the system to emulate the PACK instruction by macrocode and will allow those FLOWs in process to be voided. Finally, when the PACK macrocode is complete the system will re-initiate the pipeline with the next instruction to be processed.

It is readily apparent that both the PACK and UNPACK instructions for less than eight bytes and no overlap will be completed in three FLOWs thereby enhancing the overall performance of the system.

While the invention has been particularly shown and described with reference to the preferred embodiments thereof, it will be understood by those skilled in the art that changes in form and detail may be made therein without departing from the spirit and scope of the invention. Given the disclosure of general concepts and specific embodiments, the scope of protection sought is defined by the following claims.

What is claimed is:

1. A pressing system in a computer system for processing a MOVE instruction within an instruction set for said computer system, said computer system employing pipeline architecture in the processing of said instruction set, said system comprising:
    first means for generating a first signal when eight bytes or less are presently being processed by said MOVE instruction, said first signal indicating that a next instruction can begin to be processed during a next flow in the pipeline by said computer system following a said MOVE instruction flow presently being processed by said computer system:
    second means for generating a MOVE OVERLAP signal during said flow that said first signal was generated by said first means when eight bytes or less are being processed by said MOVE instruction and an overlap condition exists between a location in said computer system from which said eight bytes are being moved from and a location in said computer system to which said eight bytes are being moved to by said MOVE instruction; and
    said first means generating said first signal prior to said second means generating said MOVE OVERLAP signal and independent of whether said second means generates said MOVE OVERLAP signal for minimizing the number of flows required to process eight bytes or less by said MOVE instructions.

2. The processing system of claim 2 further comprising:
    third means, in response to said MOVE OVERLAP signal, for generating and storing said eight or less bytes being processed by said MOVE instruction as if said MOVE instruction had fetched, moved and stored one byte at a time.

3. The processing system of claim 3 wherein said third means completes the generation of said eight or less bytes such that said eight or less bytes are stored for completion of said MOVE instruction in the same FLOW that said MOVE OVERLAP signal was generated by said second means.

4. The processing system of claim 1 wherein said MOVE instruction is completed in two FLOWs and only one execution cycle within FLOW 2 is employed to complete said MOVE instruction.

5. A processing system in a computer system for processing an UNPACK instruction within an instruction set for said computer system, said computer system employing pipeline architecture in the processing of said instruction set, said system comprising:
    first means for generating an UNPACK THREE FLOW signal when eight or less bytes are to be unpacked by an UNPACK instruction presently being processed by said computer system and the length of a field in said computer system which is to receive the results of said UNPACK instruction presently being processed is eight bytes or less in length, said UNPACK THREE FLOW signal indicating that said UNPACK instruction needed only three FLOWs for processing and that a next instruction can begin to be processed during a next flow in the pipeline by said computer system following said UNPACK instruction flow presently being processed by said computer system;
    second means for generating a second signal if an overlap condition exists for said UNPACK instruction being processed during said flow that said UNPACK THREE FLOW signal was generated by said first means: and
    said first means generaling said UNPACK THREE FLOW signal prior to said second means generating said second signal and independent of whether said second means generates said second signal for minimizing the number of flows required to process eight bytes or less by said UNPACK instructions.

6. The processing system of claim 5 wherein said second means generates an UNPACK OVERLAP signal whenever an overlap condition exists between the fields associated with the processing of said UNPACK instruction.

7. The processing system of claim 6 further comprising:
    fourth means for generating an UNPACK BRANCH TO MACROCODE signal where eight or less bytes are to be unpacked, the length of the field where the data is to be stored is eight bytes or less in length and an UNPACK OVERLAP signal is generated by said second means, said UNPACK BRANCH TO MACROCODE signal indicating that the instruction should be executed by macrocode.

8. A processing system in a computer system for processing a PACK instruction within an instruction set for said computer system, said computer system employing pipeline architecture in the processing of said instruction set, said system comprising:
    first means for generating a PACK THREE FLOW signal when eight or less bytes are to be packed, said PACK THREE FLOW signal indicating that said PACK instruction needed only three FLOWs for processing and that a next instruction can begin to be processed during a next flow in the pipeline by said computer system following a said MOVE, PACK or UNPACK instruction flow presently being processed by said computer system;

second means for generating at second signal if an overlap condition exists for said PACK instruction being processed during said flow that said PACK THREE FLOW signal was generated by said first means; and said first means generating said PACK THREE FLOW signal prior to said second means generating said second signal and independent of whether said second means generates said second signal for minimizing the number of flows required to process eight bytes or less by said PACK instruction.

9. The processing system of claim 8 wherein said second means generates a PACK OVERLAP signal for only those overlap conditions that would destroy data during the processing of said PACK instruction.

10. The overlap processing system of claim 9 further comprising:

fifth means for generating a PACK BRANCH TO MACROCODE signal where eight or less bytes are to be packed and said PACK OVERLAP signal is generated by said second means, said PACK BRANCH TO MACROCODE signal indicating that the instruction should be executed by macrocode.

* * * * *

UNITED STATES PATENT AND TRADEMARK OFFICE
CERTIFICATE OF CORRECTION

PATENT NO. : 5,426,783
DATED : June 20, 1995
INVENTOR(S) : Chris Norrie et al.

It is certified that error appears in the above-indentified patent and that said Letters Patent is hereby corrected as shown below:

Column 11, line 36, "pressing" should be --processing--;

Column 11, line 47, the colon ":" should be a semicolon --;--;

Column 11, line 64, "claim 2" should be --claim 1--;

Column 12, line 3, "claim 3" should be --claim 2--;

Column 12, line 36, the colon ":" should be a semicolon --;--;

Column 12, line 37, "generaling" should be --generating--;

Column 13, line 5, the colon ":" should be a semicolon --;--;

Column 13, line 6, "at" should be --a--.

Signed and Sealed this

Fourth Day of June, 1996

Attest:

BRUCE LEHMAN

*Attesting Officer*       *Commissioner of Patents and Trademarks*